April 26, 1932.  F. W. SPERR, JR  1,855,615

PROCESS AND APPARATUS FOR DEHYDRATING GAS

Filed Nov. 3, 1926

INVENTOR
Frederick W. Sperr Jr.
BY
Jesse R. Langley
ATTORNEY

Patented Apr. 26, 1932

1,855,615

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

PROCESS AND APPARATUS FOR DEHYDRATING GAS

Application filed November 3, 1926. Serial No. 145,974.

My invention relates to the dehydration of gas, such as coke oven gas or other fuel gas, and it has particular relation to apparatus and processes involving the employment of hygroscopic materials.

One object of my invention is to provide a process for the dehydration of gas by bringing it into contact successively with hygroscopic materials in liquid and in solid form.

A second object of my invention is to provide a process wherein calcium chloride in solid form may be employed as a dehydrating agent.

A further object of my invention is to provide a two-stage process for dehydrating gas in which the amount of water to be removed during the second stage is such that it may be efficiently performed by hygroscopic material in solid form.

It has been previously proposed to dehydrate gas in a single stage by means of the use of hygroscopic material in solid form. Such apparatus has not, however, been successful by reason of the fact that, if efficient hygroscopic materials were employed, the amount of water removed from the gas was so great as to render the dehydrating material inactive within a very short time. In case the hygroscopic material was soluble in water, it would be washed from the supporting material within a brief period and the apparatus would become inoperative.

In addition, large amounts of hygroscopic material were required. The time required for regeneration of the hygroscopic material was so great in proportion to the time that the material was active that one mass of material could not be regenerated during the active period of another mass of material. Accordingly, the number or the volume of masses of such material or towers in which the material was contained necessary to successful or continuous operation would be so great that the installation would involve prohibitive expense.

If the hygroscopic materials were such that they did not become liquid from the absorption of moisture and were not subject to being washed from the supporting material, the capacity of apparatus of normal size was so small as to render it impracticable.

In installations of the character described above, it has been impossible to employ calcium chloride because the supply would be dissolved and "washed out" in a relatively short time by reason of the large amount of water to be removed from the gas.

In accordance with the present invention, I provide means whereby calcium chloride in solid form may be used in the final stage of the dehydration of gas, the major portion of the water content of the gas having been removed in the initial stage by the use of a solution of a hygroscopic salt in a scrubbing tower. The amount of water remaining in the gas is sufficiently small that it may be efficiently removed by the solid calcium chloride and the material is active during a period of time that is at least equal in length to the period of time required to regenerate the material by driving off the moisture therein.

Briefly, I employ in the second stage of my process two towers containing calcium chloride in solid form, one of the towers being in operation while the material in the other tower is being regenerated. Continuous operation is thereby assured.

In the accompanying drawings.

Figure 1:
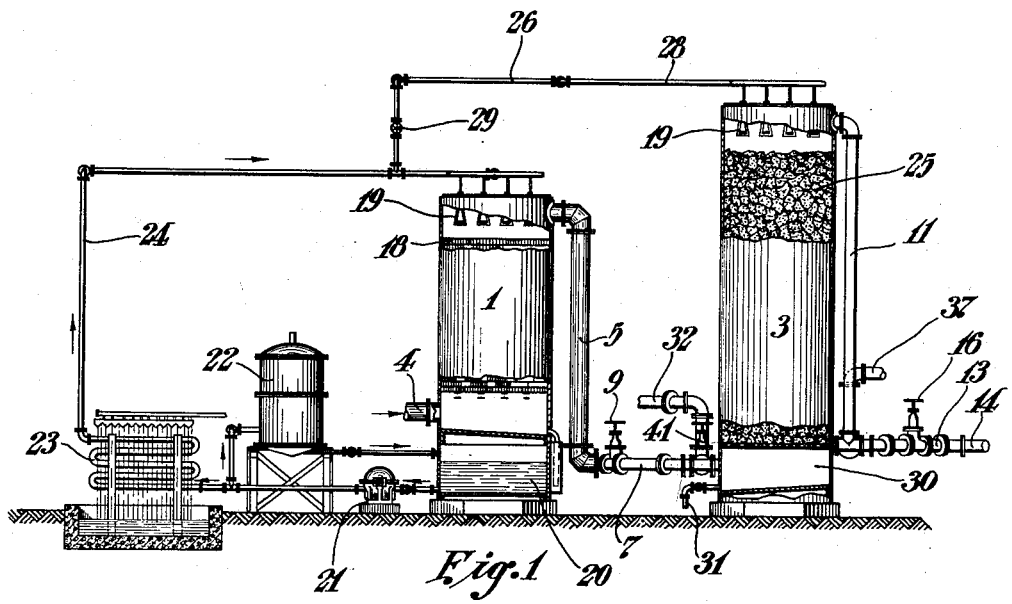
Figure 1 is a partially diagrammatic view of apparatus embodying my invention, the apparatus being shown in elevation and parts being broken away for the sake of clearness.
Figure 2:
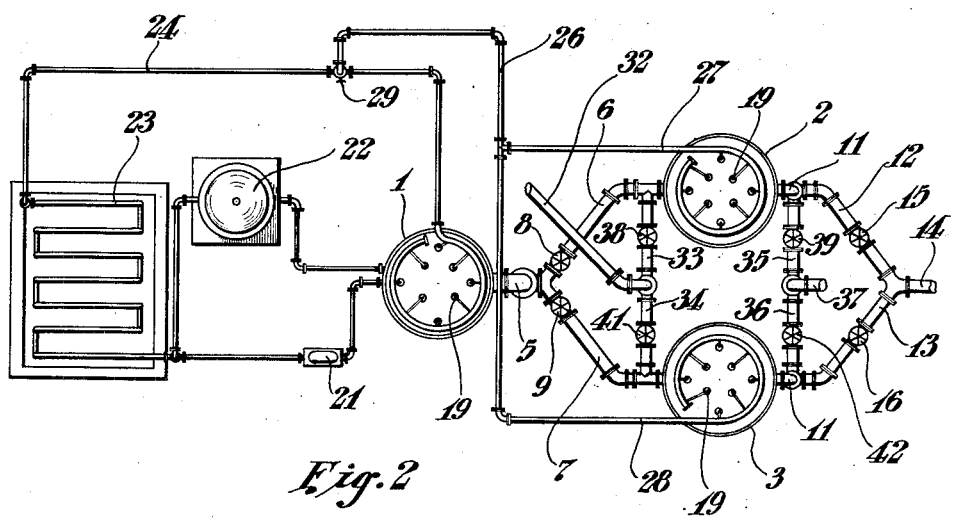
Fig. 2 is a plan view of the apparatus of Fig. 1.

The dehydrating apparatus constituting my invention comprises a scrubbing tower 1, to which hygroscopic solution is supplied, and towers 2 and 3 containing hygroscopic material in solid form. The tower 1 is provided with a gas inlet pipe 4 and an outlet pipe 5 that is connected to the towers 2 and 3 by means of branch pipes 6 and 7 that are respectively controlled by valves 8 and 9. Each of the towers 2 and 3 is provided with an outlet pipe 11 that is connected, by means of pipes 12 and 13, respectively, to a pipe 14 for conducting the gas to any suitable storage space or distribution system. The pipes 12 and 13 are respectively controlled by valves 15 and 16.

The tower 1 is provided with wooden hurdles 18, or other suitable material, upon which a solution or brine of a hygroscopic salt, such, for example, as calcium chloride or magnesium chloride, is sprayed by means of a series of sprays 19 located in the top of a tower. The tower 1 is provided with a sump 20 in the bottom thereof for collecting the dehydrating solution after it has passed through the hurdles. The circulating system for the dehydrating solution comprises a pump 21 that is connected to the sump 20, an evaporator 22, a cooler 23 and a pipe line 24 that is connected to the sprays 19.

The dehydrating solution, which is diluted when it passes through the tower and is collected in the sump 20, is maintained at its normal concentration by the evaporator 22, through which a sufficient portion of the solution is forced by the pump 21. The cooler 23, which may be of any suitable type, cools the solution before it is supplied to the sprays 19.

Each of the towers 2 and 3 is substantially filled with a mass of material comprising dehydrating material in solid form that is carried by any suitable inert material, indicated at 25, of a porous nature, such, for example, as broken coke, corn cobs, wood blocks or rough wooden hurdles. The inert material has been saturated with a solution of calcium chloride and the calcium chloride has been reduced to solid form by evaporating the water therefrom. The mass of impregnated or coated coke constitutes a body of material through which the gas circulates freely and which presents a maximum area of surface of the dehydrating material. Each of the towers is provided with sprays 19, similar to those described in connection with the tower 1, the sprays being supplied from the pipe line 24 by means of a pipe 26 and branch pipes 27 and 28. A valve 29 controls the connection of the pipe 26 to the pipe 24.

The preparation of the dehydrating material in solid form comprises, first, saturating the coke or other inert material that has been previously placed in the towers 2 and 3 with a concentrated solution of a hygroscopic salt, such, for example, as calcium chloride or magnesium chloride. This solution is applied by means of the pipes 26, 27 and 28 and the sprays 19 in the tops of the towers. The towers 2 and 3 are provided with sumps 30, by means of which any excess solution may be collected and withdrawn, as desired, through drain pipes 31.

When the coke has been thoroughly saturated with the dehydrating solution, hot gases, such, for example, as waste stack gases having a temperature of 175° to 235° C., are passed through the towers by means of a pipe 32, branch pipes 33 and 34, and then out through the outlet pipes 11 and branch pipes 35 and 36 and a pipe 37 to a stack, or other suitable source for disposing of the waste gases. The dehydrating material is heated in this manner until it is fixed on the surface of the carrying agent in solid, crystalline form having the composition of $CaCl_2$ or $CaCl_2 + H_2O$, when it is ready for use.

Each of the second-stage towers may be provided with suitable cooling coils (not shown) for quickly reducing the temperature of the heated impregnated material and for carrying away the heat produced by the absorption of water by the calcium chloride.

In the operation of the system, gas, such, for example, as coke oven gas, water gas, or other fuel gas, is supplied after suitable cooling to the inlet pipe 4 of the tower 1. The gas passes upwardly through the hurdles in contact with the dehydrating solution that is flowing downwardly in the tower, and the major portion of the water in the gas is absorbed by the dehydrating solution. The dew-point of the gas at the end of the first stage is approximately 50° F. The gas then passes out of the tower 1 through the pipe 5 and then passes through one of the towers 2 and 3.

It may be assumed, for example, that the gas is supplied from the tower 1 to the tower 2, in which case the valve 8 is opened and the valve 9 is closed. The partially dehydrated gas passes upwardly through the dehydrating material in solid form and the dew-point of the gas is further reduced to 30° F. at the end of its upward passage. The gas passes out of the tower 2 through the outlet pipe 11, the branch pipe 12 and valve 15, which is open to the pipe 14 for distribution or storage.

This operation continues until the dehydrating material in the tower 2 becomes inactive by reason of the quantity of water that has been absorbed by it. The calcium chloride should not be diluted to more than the hydrate $CaCl_2 + 6H_2O$. At the end of such period, which may be predetermined, the valve 8 is closed and the valve 9 is opened to permit the gas from the tower 1 to enter the tower 3 to continue the process described above. The dehydrated gas passes out of the tower 3, through its outlet pipe 11, branch pipe 13 and valve 16, which is now open to the pipe 14, in a manner similar to that described in connection with the tower 2.

The dehydrating material in the tower 2 is now regenerated by passing hot gases through the pipe 32, branch pipe 33, valve 38, tower 2, pipe 11, valve 39 and pipes 35 and 37 to the atmosphere through a stack, if so desired. As in the original preparation of the dehydrating material, the water absorbed by the latter is evaporated by the hot gases and the dehydrating material is restored to its normal solid form, ready for the succeeding operation. The material is regenerated in such time that the dehydrating material may be suitably cooled before gas is again admitted to the tower 2.

When the dehydrating material in the tower 3 becomes inactive, the connections are reversed and gas to be dehydrated is again admitted to the tower 2 while hot waste gases pass through the tower 3 to regenerate the dehydrating material in the manner described in connection with the tower 2. The hot gases now pass from the pipe 34, valve 41, tower 3, outlet pipe 11, valve 42 and pipes 36 and 37 to the atmosphere.

By reason of the relatively small water content in the gas after it leaves the scrubbing tower 1, the dehydrating material in the towers 2 and 3 remains active for a period that is sufficiently long to regenerate the inactive material in one of them while the dehydrating material is being employed in the other tower. If the gas treated by the solid dehydrating material contained a considerable percentage of water, the system would not operate satisfactorily by reason of the fact that the dehydrating material would be rendered inactive in a period so short that there would be insufficient time to regenerate the material in one tower before the material was rendered inactive in the other.

The following is an example of a practical installation of apparatus for practicing my process. It may be assumed that the gas is dehydrated to a dew-point of 50° F. in the first stage and it is to be dehydrated to a dew-point of 30° F. in the second stage.

It has been found that the weight of anhydrous calcium chloride, $CaCl_2 + H_2O$, carried by 1 cubic foot of coke packing is approximately 1 pound.

The weight of water absorbed per pound of $CaCl_2$ diluted from $CaCl_2 + 1H_2O$ to $CaCl_2 + 6H_2O$ has been determined as follows:

$CaCl_2$ diluted from $CaCl_2 + 1H_2O$ to $CaCl_2 + 6H_2O$.

Mcl. weight $CaCl_2 + 6H_2O = 219$.
Mcl. weight $CaCl_2 + H_2O = 129$.
Mcl. weight $CaCl_2 = 111$.
$\therefore 111\#$ $CaCl_2$ would absorb $90\#$ $H_2O$
$1.0\#$ $CaCl_2$ would absorb $0.81\# H_2O$.

In dehydrating 1000 cu. ft. of gas from a dew-point of 50° F. to 30° F., the water removed = 0.31 lb. (Gas measured at 60° F. = 30" Hg.) For a plant of 3,000,000 cu. ft. of gas per day, the total water removed per day = $0.31 \times 3000 = 930$ lbs. If the tower packing is regenerated once each twenty-four hours, the total $CaCl_2$ required in each tower = $930 \div 0.81 = 1148$ lbs.

On the basis of 1 lb. of $CaCl_2$ per cu. ft. of packing, 1148 cu. ft. of coke is required in each tower. If each tower is 6 ft. in diameter, a depth of 41 ft. is required to furnish the necessary volume of material. One tower is operated while the material in the other is being regenerated and cooled.

It will be appreciated that I have provided a system by means of which gas may be effectively dehydrated in two stages, in the first of which the major portion of the water is removed from the gas in a scrubbing tower employing dehydrating material in liquid form. In the second stage, I am enabled to employ dehydrating material in solid form to remove an additional portion of the water without the employment of the numerous appliances that are necessary in connection with the recirculation of dehydrating material in liquid form, such as are employed in connection with the tower 1. The expense of regenerating the inactive material in the second stage of the process is very small, because stack gases of comparatively high temperature are usually available where gas is manufactured and this product would otherwise pass directly into the atmosphere.

It will be understood that, while coke has been given by way of example as the preferred inert material employed in connection with the dehydrating material, any suitable porous material may be employed as a substitute therefor. Also, calcium chloride has been specified as the preferred dehydrating material to be employed in solid form. My invention is not, therefore, to be limited except as expressed in the appended claims.

I claim as my invention:

1. A two-stage process for dehydrating fuel gas which comprises treating the gas with a continuously circulating liquid solution of a hygroscopic salt to remove the major portion of water therefrom, removing water from said solution and recirculating the latter, treating the gas with hygroscopic material in solid form to remove additional water therefrom, and then regenerating the solid material.

2. Dehydrating apparatus comprising a scrubbing tower provided with a solution of calcium chloride, a plurality of containers each of which is provided with a mass of inert material having calcium chloride in solid form associated therewith, a source of gas to be dehydrated, a source of heated gases and means for selectively connecting said tower or said source of heated gas to said containers.

3. Dehydrating apparatus comprising a scrubbing tower provided with a hygroscopic solution, a plurality of masses of inert material coated with a dehydrating agent in solid form and means for alternately subjecting said material to gas from said tower to be dehydrated and to means for regenerating said dehydrating agent.

4. Dehydrating apparatus for fuel gas comprising a scrubbing tower, means for continuously supplying said tower with a hygroscopic solution for flow countercurrent to said gas, means for removing water from the circulated solution to prepare it for recirculation, a plurality of towers containing hygroscopic material in solid form, and means for selectively regenerating the solid material in one of said towers while gas flows through the other tower containing solid material and in series with said scrubbing tower.

5. A two-stage process for continuously dehydrating fuel gas comprising passing the gas counter current to a solution of a hygroscopic salt for removing a portion of the water from said gas, removing water from part of said solution for recirculation while another part of said solution is in contact with the gas, contacting the gas with hygroscopic material in solid form, and regenerating part of said solid material while another part is in contact with said gas.

6. A two-stage process for continuously dehydrating fuel gas comprising passing the gas countercurrent to a solution of calcium chloride for removing a portion of the water from said gas, removing water from part of said solution for recirculation while another part of said solution is in contact with the gas, contacting the gas with calcium chloride in solid form, and regenerating part of said calcium chloride while another part is in contact with said gas.

In testimony whereof, I have hereunto subscribed my name this second day of November, 1926.

FREDERICK W. SPERR, Jr.